United States Patent [19]
Breault

[11] Patent Number: 5,637,198
[45] Date of Patent: Jun. 10, 1997

[54] VOLATILE ORGANIC COMPOUND AND CHLORINATED VOLATILE ORGANIC COMPOUND REDUCTION METHODS AND HIGH EFFICIENCY APPARATUS

[75] Inventor: Ronald W. Breault, Kingston, N.H.

[73] Assignee: Thermo Power Corporation, Waltham, Mass.

[21] Appl. No.: 414,584

[22] Filed: Mar. 31, 1995

Related U.S. Application Data

[63] Continuation-in-part of Ser. No. 274,232, Jul. 13, 1994, abandoned, and Ser. No. 124,693, Sep. 20, 1993, Pat. No. 5,458,748, which is a continuation-in-part of Ser. No. 93,998, Jul. 19, 1993, abandoned, which is a continuation of Ser. No. 824,596, Jan. 23, 1992, Pat. No. 5,240,575, which is a continuation of Ser. No. 555,561, Jul. 19, 1990, Pat. No. 5,147,516, said Ser. No. 274,232, is a continuation of Ser. No. 824,596.

[51] Int. Cl.$^6$ ............................................. B01J 19/08
[52] U.S. Cl. ..................... 204/165; 204/168; 204/169; 204/170; 422/186.04; 422/186.22; 422/907; 588/210; 588/212
[58] Field of Search ................................ 204/164, 165, 204/168, 169, 170; 422/186.04, 186.22, 907; 588/210, 212

[56] References Cited

U.S. PATENT DOCUMENTS

| | | | |
|---|---|---|---|
| 3,205,162 | 9/1965 | MacLean | 204/165 |
| 3,562,127 | 2/1971 | Woonton et al. | 204/164 |
| 3,983,021 | 9/1976 | Henis | 204/164 |
| 4,253,925 | 3/1981 | Mason | 204/277 |
| 4,430,303 | 2/1984 | Linde | 204/170 |
| 4,657,738 | 4/1987 | Kanter et al. | 204/272 |
| 4,695,358 | 9/1987 | Mizuno et al. | 204/179 |
| 4,774,062 | 9/1988 | Heinemann | 422/907 |
| 4,894,131 | 1/1990 | Jacobs et al. | 204/165 |
| 4,954,320 | 9/1990 | Birmingham et al. | 422/186.04 |
| 5,120,508 | 6/1992 | Jones | 422/170 |
| 5,236,672 | 8/1993 | Nunez et al. | 422/186.04 |
| 5,439,568 | 8/1995 | Uchiyama | 204/164 |

OTHER PUBLICATIONS

K.S. Visvanathan, *Journal of the Indian Chemical Society*;"The Decomposition of Nitric Oxide in the Silent Electric Discharge"; 29:307–316 (1952) no month available.

K.S. Visvanathan, *Journal of the Indian Chemical Society*;"The Decomposition of Nitric Oxide in the Silent Electric Discharge"; 30:836–40 (1953) no month available.

Joshi, Shridhar S.; *Transactions of the Faraday Society*; "The Decomposition of Nitrous Oxide in the Silent Electric Discharge"; 23:227–38 (1927) no month available.

Joshi, Shridhar S.; *Transactions of the Faraday Society*; "The Decomposition of Nitrous Oxide in the Silent Electric Discharge"; 25:108–17 (1929) no month available.

Joshi, Shridhar S.; *Transactions of the Faraday Society*; "The Decomposition of Nitrous Oxide in the Slient Electric Discharge The Variation of the Current and of the Power during the Reaction"; 25:118–28 (1929) no month available.

Joshi, Shridhar.; *Transactions of the Faraday Society*; "The Decomposition of Nitrous Oxide in the Silent Electric Discharge, Influence of the Addition of Foreign Gases" 25:137–47 (1929) no month available.

Brewer, A. Keith and Westhaver, J.W., Journal of Physical Chemistry; "The Synthesis of Ammonia in the Glow Discharge", 33:883–89 (1929) no month available.

PCT Publication No. WO92/19361 dated Nov. 12, 1992, ref. PCT Applic. No. US92/03490.

(List continued on next page.)

*Primary Examiner*—Bruce F. Bell
*Assistant Examiner*—Kishor Mayekar
*Attorney, Agent, or Firm*—Lorusso & Loud

[57] ABSTRACT

This invention is drawn to a Volatile Organic Compound environment effective reduction apparatus comprising a reactor-efficient coronal discharge zone, and at least one pair of high-dielectric coated electrodes. In particular embodiments Halogenated volatile organic compounds are reduced and the reaction chamber is chlorine and fluorine resistant.

35 Claims, 10 Drawing Sheets

OTHER PUBLICATIONS

Publication of Fifth Annual Coal Preparation, Utilization and Environment Control Contractors Conference (Jul. 31–Aug. 3, 1989) "Electro–Catalytic Reduction of Nitrogen Oxides", V.K. Mathur and C.R. McLarnon.

"A Unified Projection of the Performance and Economics of Radiation–Initiated $NO_x/SO_x$ Emission Control Technologies", Person et al., DOE Contract #DE–AC22–84 PC70259 (1985) no month available.

G. Lacoste and R. Bes, *Rev. Chim Minerale*, 11:141–48 (1974) no month available.

R. Bes, *Rev. Phys. Appl.* 12:1029–34 (1977) no month available.

van den Bleek, et al., *I. Chem E. Symposium Series*, U. of Salford; "Problems Around the Reduction of Nitrogen Oxides in the Presence of Oxygen" (1979) no month available.

"An Advanced Corona Discharge $NO_x$ Control System", Ronald W. Breault, Christopher Mclarnon, V.K. Mathur, Mike Landau, AIChE Spring National Meeting, Session 65: Coal Combustion Flue Gas Cleanup I, Minneapolis, Minn. (1992) (no month available).

"Development and Decomposition of an Electro–Oxidation Process for the Destruction of Chlorinated Volatile Organic Compounds (CVOC's)", Tecogen Inc., Dept. of Energy Contract No. DE–RA21–92MC28245 (no date available).

"Low Quality Natural Gas Sulfur Removal/Recovery", Tecogen Inc., Dept. of Energy RFP No. De–RP21–91MC28133 (no date available).

"Reaction Gas Kinetics for Flue Gas, Gas Treatment of $NO_x$", Ronald W. Breault, Christopher McLarnon, V.K. Mathur, NATO Advanced Research Workshop on Non–Thermal Plasma Techniques for Pollution Control (Cambridge University, England, Sep. 21–25, 1992).

"The Tecolytic™ Process. An Advanced $NO_x$ Control System", Ronald W. Breault, V.K. Mathur, Christopher McLarnon, Jeff Chini, International Gas Research Conference (Orlando Florida, Nov. 16–19, 1992).

"The Tecolytic™ Process. An Advanced $NO_x$ Control System", Ronald W. Breault, V.K. Mathur, Christopher McLarnon, Jeff Chini, International Gas Research Conference (Orlando Florida, Nov. 16–19, 1992).

"An Advanced Corona Discharge $NO_x$ Control System", Ronald W. Breault, Frederick E. Becker, V.K. Mathur, Christopher McLarnon, Jeff Chini, AIChE Spring National Meeting, Session 99: Contaminants Removal From Gas II, New Orleans, Louisiana (1992) (no month available).

VOLATILE ORGANIC COMPOUND AND CHLORINATED VOLATILE ORGANIC COMPOUND REDUCTION METHODS AND HIGH EFFICIENCY APPARATUS

This application is a continuation in part of application Ser. No. 08/124,693 filed Sep. 20, 1993, now U.S. Pat. No 5,458,748 issued Oct. 17, 1995, which is a continuation in part of application Ser. No. 08/093,998, filed Jul. 19, 1993, (now abandoned) as well as application Ser No. 08/274,232, filed Jul. 13, 1994, now abandoned, both of which are continuations of Ser. No. 07/824,596, filed Jan. 23, 1992, now U.S. Pat. No. 5,240,575 issued Aug. 31, 1993, which is a continuation of application Ser. No. 07/555,561 filed Jul. 19, 1990, now U.S. Pat. No. 5,147,516, issued Sep. 15, 1992, the teachings of which are incorporated herein by reference.

FIELD OF THE INVENTION

Elimination of Volatile Organic Compounds ("VOC") and Halogenated Volatile Organic Compounds, including Chlorinated Volatile Organic Compounds ("CVOC") from the environment represents a significant challenge for industry. This invention presents an VOC environment effective reduction apparatus. In a particular embodiment the method and apparatus entails CVOC environment effective reduction. In some embodiments the apparatus is chlorine and fluorine resistant.

BACKGROUND OF THE INVENTION

Millions of tons of VOCs, HVOCs, and nitrogen oxides, (denoted, generally herein as "$NO_x$"), are emitted into the atmosphere each year as a result of high temperature combustion of fossil fuels. All of these compounds contribute to atmospheric pollution.

Previous investigation on chemical reactions in electrical discharge includes the work of Joshi in the 1920s ($NO_2$ and $N_2O$ decomposition/electron movement between glass walls in AC discharge), Visvanathan in the 1950s (NO decomposition in electric charge). Others looking at the general conditions of electric/chemical reactions include Brewer and Westhaver (*J. of Phys. Chem.*; 33:883 (1929)), Lacoste, G. and Bess, R (*Rev. Chim. Minerale.*; 11:14 (1974)), Bess, R. (*Rev. Phys. Appl.*; 12:1029 (1977)). A more comprehensive presentation of the previous work in nitrogen oxide control is presented in *A Unified Projection of the Performance and Economics of Radiation-initiated $NO_x/SO_x$ Emission Control Technologies*, Person et al. Dept. of Energy Contract No. DE-AC22-84PC70259 (1985), the teachings of which are incorporated herein by reference. Particular note is made of the following, "An Advanced Corona Discharge NOx Control System," Ronald W. Breault, Frederick E. Becker, V. K. Mathur, Christopher McLarnon, Jeff Chini, AIChE Spring National Meeting, Session 99: Contaminants Removal From Gas II, New Orleans, La. (1992); "Reaction Gas Kinetics for Flue Gas, Gas Treatment of NOx", Ronald W. Breault, Christopher McLarnon, V. K. Mathur, NATO Advanced Research Workshop on Non-Thermal Plasma Techniques for Pollution Control (Cambridge University, England, Sep. 21–25, 1992); "The Tecolytic™ Process. An Advanced NOx Control System", Ronald W. Breault, V. K. Mathur, Christopher McLarnon, Jeff Chini, International Gas Research Conference (Orlando Fla., Nov. 16–19, 1992), the teachings of which are incorporated herein by reference.

Other works on electro-catalysts take a position directly opposite from the instant invention. Such are those of van den Bleek, et al., (*I. Chem. E. Symposium Series*, U. of Salford (1979)) stating that efficiency of nitrogen oxide reduction is improved when catalytic surfaces are able to donate an electron to the oxide, and Wooten and Mangold (U.S. Pat. No. 3,562,127 (1971)) (using gold plated, i.e. conductive, metal wool) and reporting augmented nitrogen reduction only when gold is used.

The instant inventive apparatus and method overcomes the problems previously encountered in the art. This invention employs a novel concept based on recognizing chemical reactions occurring in gaseous electrical discharge as distinct from reactions that result when equally energetic electrons are made to travel on metal surfaces.

SUMMARY OF THE INVENTION

This invention comprises a VOC environment effective reduction apparatus comprising a reactor-efficient coronal discharge zone, and at least two high-dielectric coated electrodes of opposing polarity. In one embodiment the apparatus reactor-efficient coronal discharge zone further comprises a cylindrical discharge zone (optionally a high dielectric coronal-catalyst), and centrally located in said cylindrical discharge zone is at least one electrode of said opposing electrodes wherein said central electrode is substantially linear and substantially of round cross sectional area.

Examples of high-dielectric coronal-catalyst comprises glass wool. Particular high-dielectric coronal-catalyst are in filamentous form, including alumina, zirconia, magnesia or a titanate (e.g. calcium, zinc or barium).

In some embodiments the apparatus is charged to at least about 1 eV, or from at least about 2 eV, from at least about 2.3 eV, from at least about 5 eV, and from at least about 6.5 eV or higher. Similarly, in particularly embodiments at least about 99% of the flow through the system subjected to at least about 1 eV, at least about 2 eV, at least about 2.3 eV, at least about 5 eV, or at least about 6.5 eV or higher.

In particular embodiments the coronal discharge zone is chlorine-resistant or fluorine resistant. One chlorine-resistant coronal discharge zone is glass lined. One fluorine resistant coronal discharge zone is polytetrafluoroethylene lined.

In another embodiment, the present invention comprises a chlorine insensitive coronal discharge VOC reduction apparatus comprising a substantially chlorine resistant interior reaction chamber having a gas inlet and gas outlet; and, disposed within said reaction chamber at least two spaced substantially parallel interdigitating substantially linear high-dielectric coated electrodes wherein said electrodes are of opposite polarity, and opposition-maximized.

In particular examples of such apparatus the chlorine resistant reaction interior chamber is non-metal lined. Also contemplated is an apparatus of having further disposed within the reaction chamber a filamentous coronal-catalyst of glass wool or ceramic-glass wool.

In yet other embodiments the apparatus non-metal interior reaction chamber is a fluorine resistant non-metal such as polytetrafluoroethylene.

A particular aspect of the present invention is a reactor-efficient coronal discharge chamber comprising a non-metal reaction chamber having a gas inlet and gas outlet; and, disposed within said reaction chamber at least two spaced substantially parallel interdigitating substantially linear high-dielectric coated electrodes wherein said electrodes are of opposite polarity and opposition-maximized. Optionally, further disposed within such reaction chamber is a filamentous coronal-catalyst of glass wool or ceramic-glass wool. In certain configurations the apparatus non-metal interior is a fluorine resistant non-metal such as polytetrafluoroethylene.

The present invention also encompasses a method of VOC environment effective reduction comprising subjecting a VOC containing gas to a reactor-efficient coronal discharge zone, and at least two high-dielectric coated electrodes of opposing polarity, wherein said coronal discharge zone exposes said gas to a coronal-catalyst charged at from at least about 1 eV, and in some embodiments from at least about 2 eV, or from at least about 5 eV or higher.

In some embodiments if this method the reactor-efficient coronal discharge zone further comprises a cylindrical discharge zone, and centrally located in said cylindrical discharge zone is at least one electrode of said opposing electrodes wherein said central electrode is substantially linear and substantially of round cross sectional area. In some configurations utilizing the method the coronal discharge zone comprises a high dielectric coronal-catalyst such as glass wool. Particular high-dielectric coronal-catalyst are used in filamentous form in such method. Examples are alumina, zirconia, magnesia or a titanate (e.g. calcium, zinc or barium), and optionally including $TiO_2$. In such method the gas is exposed to coronal-catalyst charged at from at least about 1 eV.

The present invention also includes a method of decomposing halogenated volatile organic compounds carried in a gas stream flowing in chlorine insensitive coronal discharge VOC reduction apparatus comprising a substantially chlorine resistant interior reaction chamber having a gas inlet and gas outlet; and, disposed within said reaction chamber at least two spaced substantially parallel interdigitating substantially linear high-dielectric coated electrodes wherein said electrodes are of opposite polarity, and opposition-maximized by the step of exposing said stream to a coronal-catalyst charged at from at least about 1 eV, or from at least about 2 eV.

BRIEF DESCRIPTION OF THE DRAWINGS

FIG. 6(b) presents a detail of electrode to reactor wall configuration.

DETAILED DESCRIPTION OF THE INVENTION

Figure 1:
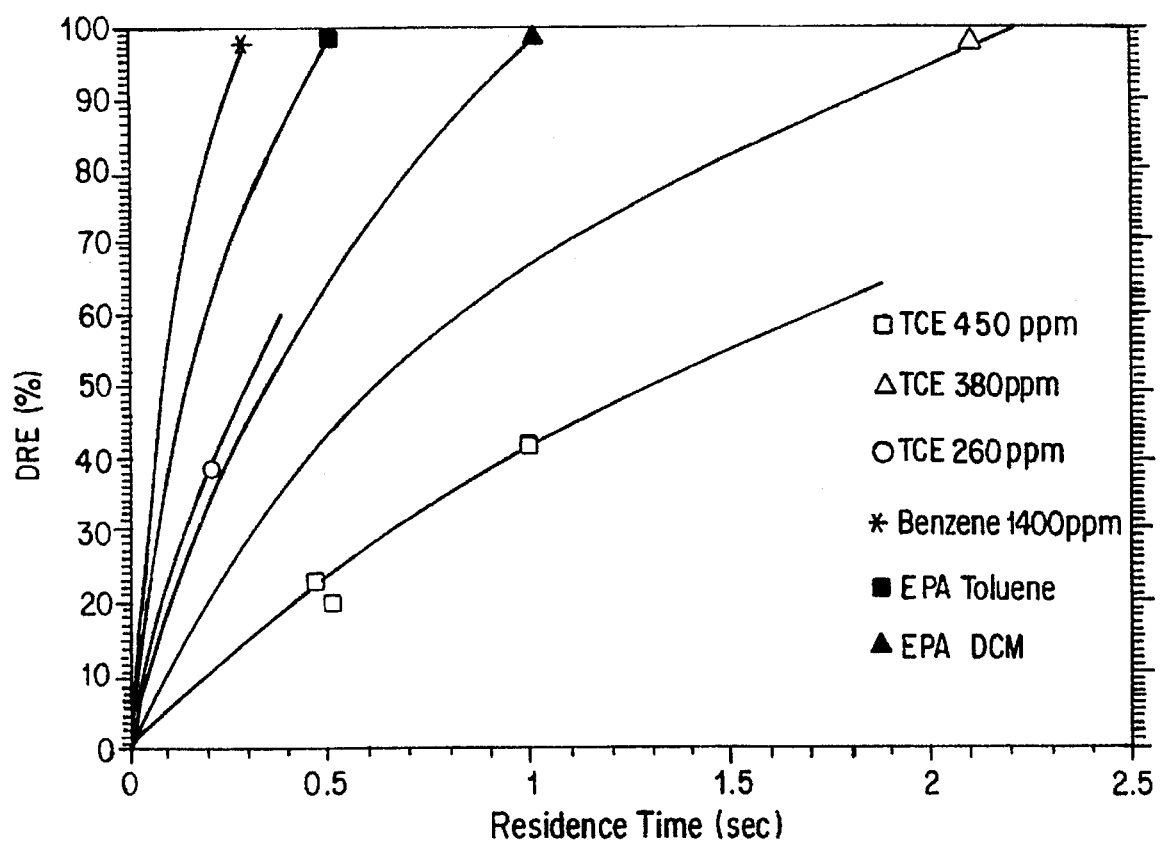
FIG. 1 presents DRE data for coronal conversion Processes for VOC destruction in air.

The instant invention is most clearly understood with reference to the following definitions:

A. Volatile Organic Compounds or "VOC's" shall include, without limitation, cyclic and aromatic hydrocarbons such as benzene, toluene, pyridine, grease cutters and solvents (e.g., petroleum distillates), trichloroethylene, furans, acetone, carbon tetrachloride, petroleum residues including gasoline, fuel oils, and kerosene. In some embodiments VOCs will be present at about 2000 ppm.

B. Halogenated Volatile Organic Compounds includes Chlorinated Volatile Organic Compounds and Fluorinated Volatile Organic Compounds. CVOC particularly includes, carbon tetrachloride and trichloroethylene. Fluorinated Volatile Organic Compounds particularly include Freon™ type chloro-fluoro carbons used as refrigerants and solvents.

C. "Reactor-efficient" coronal discharge chamber shall mean at least about 95% of the gas flowing through the reactor passes through the corona over at least about a 15 microsecond (residence time). In a particular embodiment at least about 99% of the gas flowing through the reactor pass through the corona, and residence time will be at least about $200 \times 10^{-3}$ sec. In a particular embodiment, the residence time of at least about 15 milliseconds or at least about 200 milliseconds is obtained in passage through the corona associated with a single row of electrodes. In other embodiments, these residence times will be cumulative based upon repeated passages through corona associated with succeeding rows of electrodes.

A particular embodiment of reactor-efficient exposes at least about 99% of the gas flowing through the system to a minimum of at least about 6.5 electron volts, or at least about 80 joules per molecule.

Structurally, in a particular embodiment it has been found that reactor-efficient design entails having the corona span the entire cross-section of the reaction chamber, such that there are no passages through the reactor that to not traverse the corona. In specific embodiments this entails having electrodes flush with the interior edges of the reactor space. In some configurations this entails having more electrodes of one polarity than the other. For example, a row of electrodes can entail 4 positive electrodes interdigitated with three negative electrodes with the dielectric of the outer most positive electrodes adhered to or abutting the reactor wall.

It is noted that plate shaped electrodes are substantially less tolerant than cylindrical electrodes in permitting the; flow of gas through the system, and in establishing generally arc free reactor-efficient conditions. In some embodiments this is reduced by having the plates only generally parallel by reason of convex surfaces facing each other. Parallel plates generally entail higher resistance to gas flow due to the small inter-plate apertures.

Electrodes of this invention are substantially parallel, substantially round in cross section and substantially linear. In some embodiments substantially parallel, substantially round in cross section and substantially linear maybe angled such as in a right angle while maintaining uniform inter-electrode distances.

Electrodes are hollow or solid. In one embodiment, the electrodes are fashioned of a conductive material being deposited on the interior surface of a hollow high dielectric material such as a glass tube. In such instance contact with a power source is obtained by forming an electrical linkage such as by means of a wire between the power source and the conductive lining of the dielectric. In other embodiments the electrode optionally comprise a wire coaxial with the high dielectric tube. In a particular example, the electrode comprises mercury or other conductive liquid within a high dielectric tube. Clearly, a metal rod can be inserted into a high dielectric tube as well, but attention must be paid to the differential expansion of the conductive electrode and the high dielectric. This problem is less acute in applications limited to lower temperature reduction as is usually sufficient for VOC/CVOC reduction applications. This is below about 400° F., and often below about 100° F.

Conditions of substantially parallel, interdigitating, and substantially linear refer to configurations that maintain a constant inter electrode distance as to electrodes of opposite polarity so as to maintain maximum coronal coverage of the reaction chamber. Also contemplated is electrodes turned 90° but remaining in parallel. FIG. 6(e).

D. "opposition-maximized," as to electrode placement, means that the polarity of electrodes and the placement of electrodes is configured such that electrodes of a first polarity are most closely approached by electrodes of the opposite polarity. Reference to FIG. 6(d) shows one such placement.

E. "non-metal" as describing a reaction chamber or coronal discharge zone means that essentially no exposed metal or conductive material is "visible" to gas flowing through the chamber. The visible surfaces of the reaction chamber or coronal discharge zone include the surfaces of any high-dielectric coated electrodes within said zone or chamber or the corollary of high dielectric coated (internally) with conductive material. In certain embodiments attaining a non-metal discharge zone entails using plastic as structural or coating material over electronic components that comprise the reaction chamber. Many such non-metals are also high dielectric materials such as quartz, glass (including PYREX® glass), alumina, mullite or other high dielectric materials known in the art.

F. "Resistant" as a property of material relative to chlorine or fluorine means that such resistant material will not suffer substantial structural degradation from chlorine or fluorine (respectively) under conditions of use. Typical chlorine resistant materials are glass and polytetrafluoroethylene (also referred to as TEFLON®) and polyethylene. Polytetrafluoroethylene is also fluorine resistant. To accommodate engineering considerations such as structural, dielectric, and cost factors, it is contemplated that combinations of dielectric and resistant materials be employed. In one such example, a glass lined electrode is used, with the glass, in turn, lined or coated with polytetrafluoroethylene.

In connection with such resistance, and elsewhere, this invention discloses a reaction chamber that is "lined;" here with resistant materials. This term refers to coatings and surface compositions, but further is expansively used to include such resistant material or materials being structural components themselves. Thus, a "non-metal lined" or "glass lined" reaction zone or coronal discharge zone, in a particular embodiment, is a chamber constructed of a non-metal (which includes glass) or other resistant material, with other components, such as electrodes, or conductive coatings, applied or attached thereto, or otherwise in functional proximity.

G. "Water tolerant" shall be understood to mean greater than about 3% water vapor tolerant. In particular embodiments water tolerance will include water vapor greater than about, variously, 7%, 10% and 15% water tolerant, and about 5 to about 18% water tolerant. "Tolerant" refers to a coronal catalyst having a loss of efficacy in VOC removal of no more than about 20% the efficacy experienced in reducing nitrogen and sulfur oxides in flue gas containing about 2% water vapor. In particular embodiments the loss will be, variously, less than about 10%, and less than about 5%. Due to the unique aspects of this invention, in some instances, water vapor will increase the efficacy of VOC removal by about 5%, 10% or even up to about 20%.

H. "N/S Oxide" refers to oxides of nitrogen and sulfur including, NO, $HNO_3$, $SO_2$, $NO_2$, $N_2O_4$, $H_2SO_4$, $H_2S$, $CH_3SH$, $CH_3S_2CH_3$, etc.

I. "Coronal-catalyst" shall mean those catalysts which are not substantially surface area dependent as to catalytic activity. A coronal-catalyst is defined by an environment having dispersed electron charge or electrical field, with a flow of electrons through a gas thereby enhancing electron density of the flow path. Thus, even a packing free column subject to coronal discharge constitutes a coronal-catalyst.

Typically, a coronal catalyst is a result of the enhancement of an electron field established between two electrodes characterized in the field being arc-free at a supra-arc voltage ("supra-arc voltage arc-free"). FIGS. 3(a)–(f) provide graphic representations of zones which are supra-arc voltage arc-free. Glass wool is a useful chlorine resistant filamentous coronal catalyst. Alumina, polytetrafluoroethylene and polyethylene are useful fluorine resistant catalysts available in filamentous form. Polytetrafluoroethylene and polyethylene are most useful below about 400° F., and particularly below about 300° F.

J. "Supra-arc voltage arc-free" shall mean a voltage, when applied across a gas disposed between two electrodes of an apparatus of this invention, that:
(I) is at least sufficient to establish an electrical field in an area open to gas to be treated where such field strength equals or exceeds the critical field strength value for the gas being treated; but,
(ii) is less than that voltage which establishes an electrical field throughout said gas (i.e., all of the gas between the two electrodes) whose field strength equals or exceed the critical field strength for the gas.

In VOC removal, hydrocarbons are frequently oxidized to partially oxidized to CO or fully to $CO_2$ and $H_2O$. Chlorohydrocarbons are oxidized to $CO_2$, $H_2O$, and HCl. With highly soluble gases such as HCl, post-reaction scrubbing is useful to remove such gas before off-gas venting. In some instances destruction is distinguished from removal in that destruction is a $CO_2$ or $H_2O$ endpoint and removal is conversion to species that more easily removed from an emission stream than the original VOC or CVOC. In FIG. 1 the destruction removal efficiency of a variety of organics oxidized in air by a corona discharge at ambient temperature in laboratory corona reactors are presented as a function of reactor residence time. The figure discloses trichloroethylene, (TCE) at variously at 450 ppm (□), 380 ppm (Δ), TCE 260 ppm (○), benzene 1400 ppm (✱), toluene (■), DCM (▲).

Figure 2:
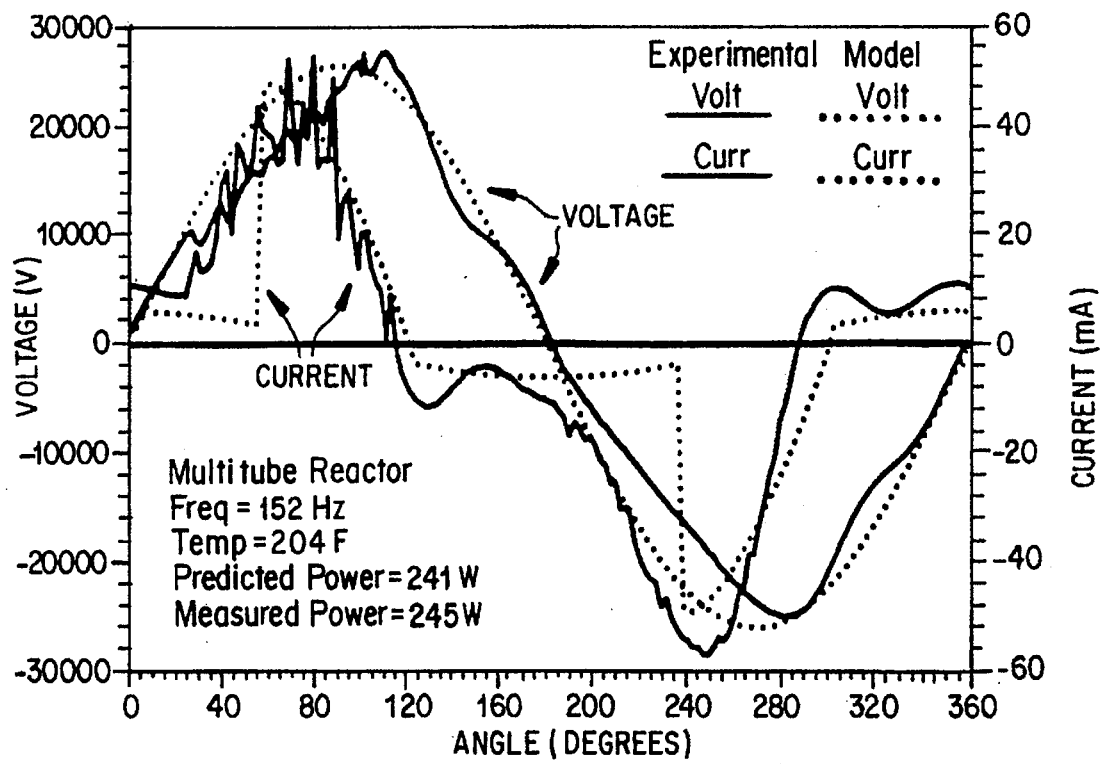
FIG. 2 compares the predicted and experimental performance of tubular reactors of the invention at 150 Hz.
Figure 3:
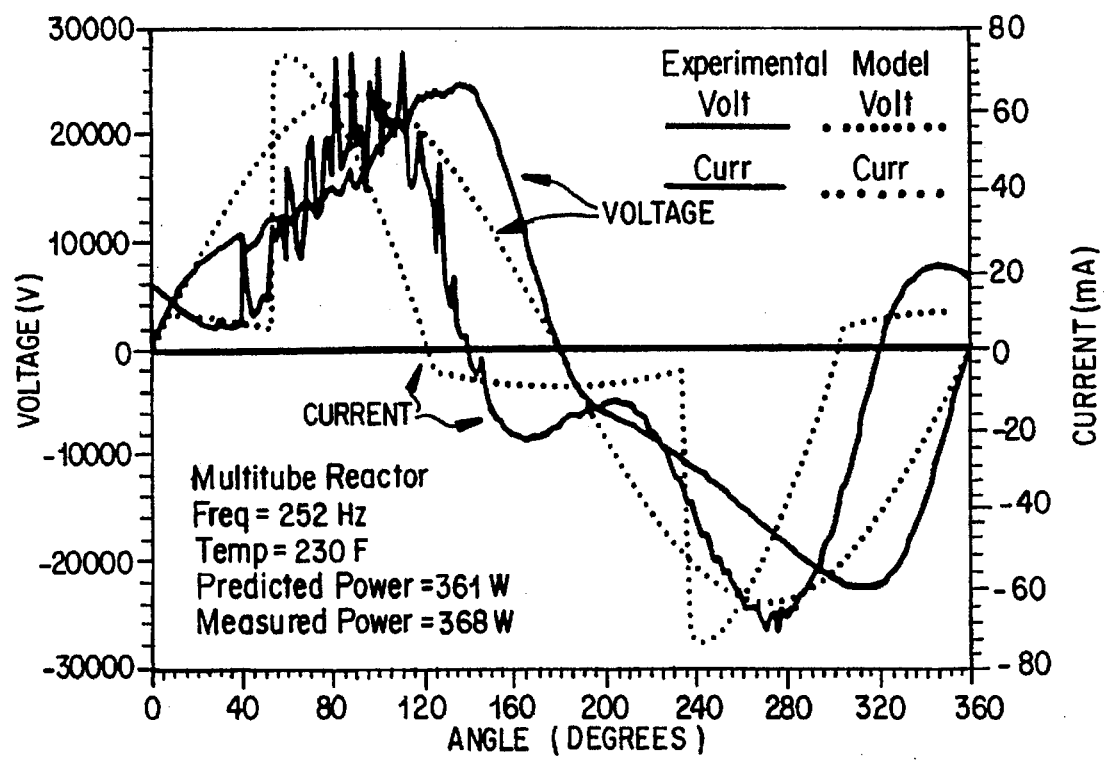
FIG. 3 compares the predicted and experimental performance of tubular reactors of the invention at 250 Hz.

FIGS. 2 and 3 provide illustrations of the high correspondence between an electrical model for a tubular coronal reactor and experimental performance. FIG. 2 discloses a predicted power of 241 watts and a measured power of 245 watts. Similarly, in FIG. 3, 361 watts are predicted and 368 watts measured. Thus, electrical modeling is a convenient method of determining reactor design factors, including power consumed, maximum voltage gradients in a given dielectric barrier (here glass), and the gas space for differing reactor configurations and conditions. These values can then be compared to the maximum allowable gradients before breakdown of the dielectric or arcing in the gas space.

Figure 4:
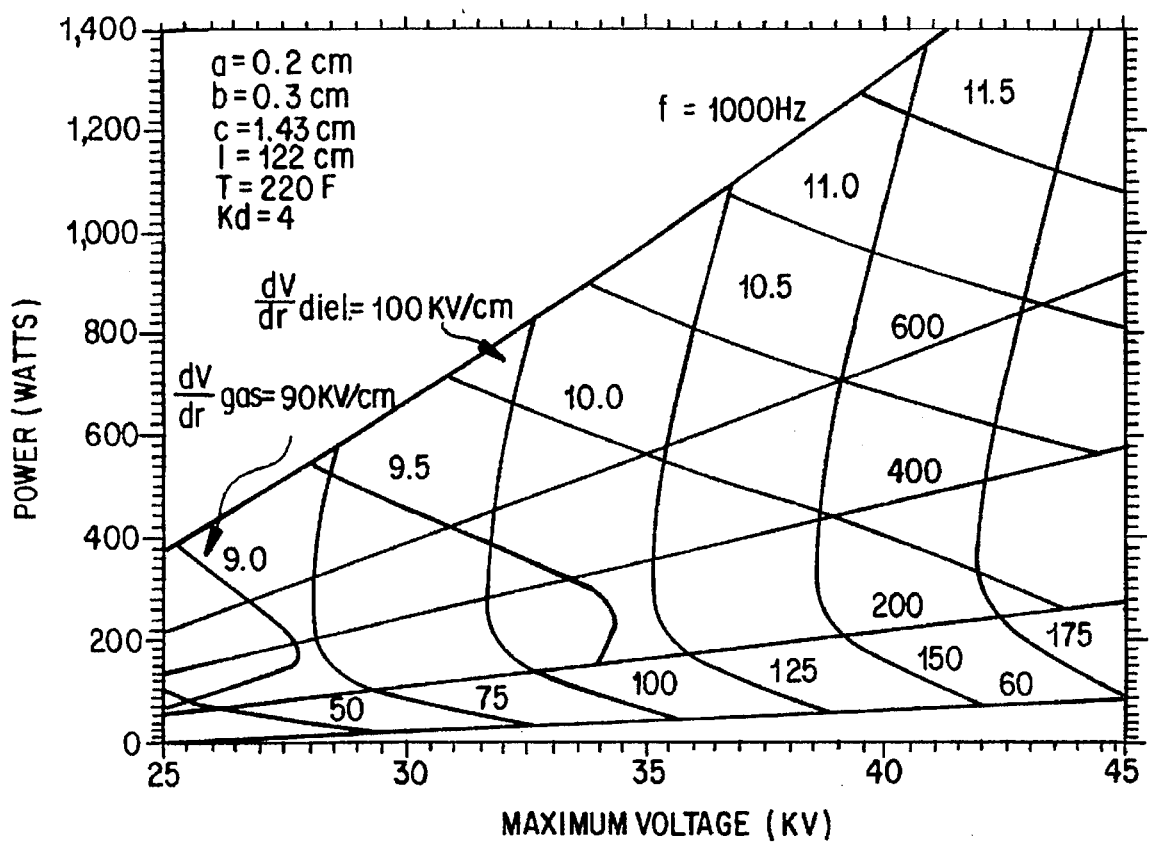
FIG. 4 provides a predictive model for reactor design, including power consumed, maximum voltage gradients, and the gas space for differing reactor configurations and conditions.
Figure 5:
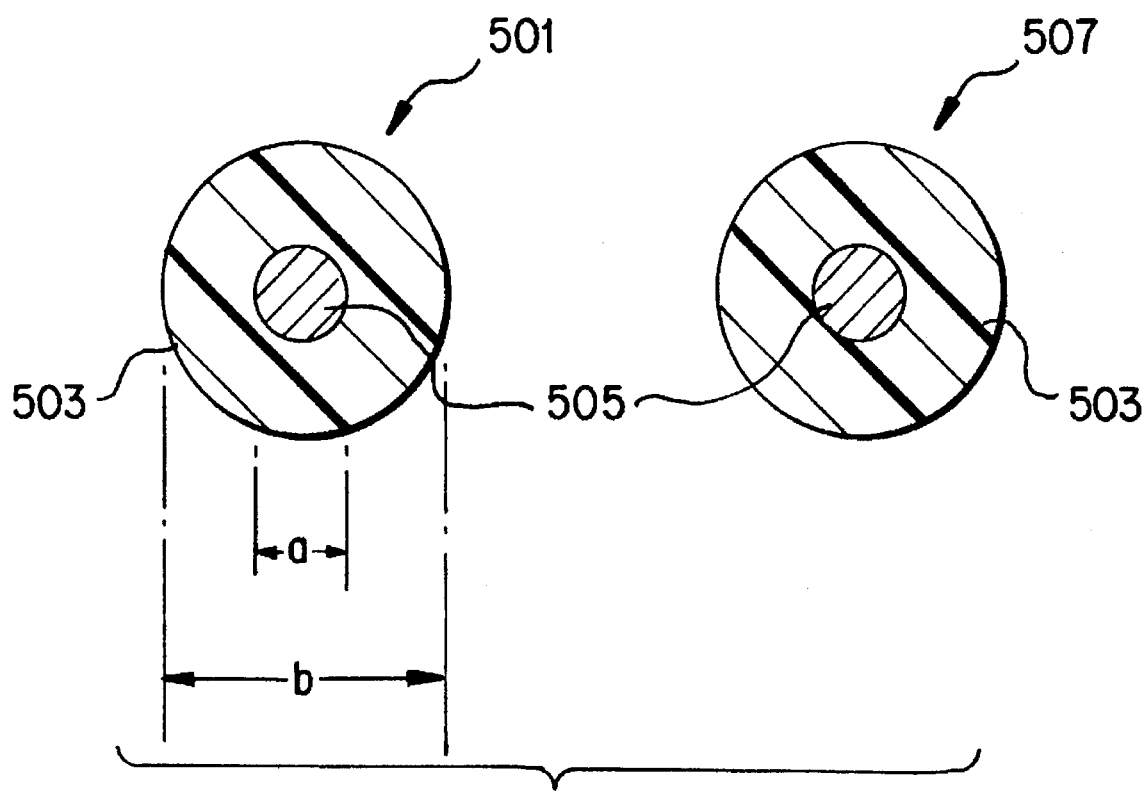
FIG. 5 presents an example of a corona disposed between electrodes of opposite polarity.

FIG. 4 presents the power consumed and the voltage gradients in glass dielectric, along with the gas space for varying voltages and frequencies applied to tubular reactors configurations. Such a configuration is that of FIG. 5, modified to be two opposing electrodes adapted for geometrical changes. a both the first electrode (501) and the opposing electrode (507) are shown cut across the length (end on). Conductive material (505) in the center of each electrode surrounded by high dielectric (503).

Coupling the chemical kinetics and the electrical models results in a simple DRE relation:

$$DRE = 1 - \exp\left[-\left(\frac{1}{K}\right)\left(\frac{\text{Power In}}{SCFM - \text{ppm}}\right)\right]$$

where K is an experimentally determined constant for a given reactor and compound.

The reactor of the present invention is particularly reactor efficient. In specific embodiments the unique geometry provides advantages over conventional reactors. Conventional reactors of tubular arrays, such as those used in ozone production, employ annular electrodes with small gap thickness, with a length up to several feet. Gas flows axially through the annular gap. In such reactor configuration the space between tubes is not used for reaction, and the corona is localized about the central electrode of each tube, near the central electrode where the electric field is greatest. Such configuration is not "reactor-efficient." As reactor efficiency is directly related to gas exposure to corona, reduced coronal coverage reduces reactor efficiency. In fact, such reactors typically have only 15% of the reactor volume representing space with both gas flow and coronal coverage. In reactor efficient configurations of the present invention, such as that of FIG. 6, electrodes are configure to maximize the number of electrodes surrounded by opposing electrodes. This geometry results in a sheet corona between positive and negative electrodes (FIG. 6(d)). In one embodiment, gas flow is perpendicular to the electrodes and the entire reactor is open to gas flow (FIG. 6(a)).

In FIG. 6(a) attention is drawn to the reactor coronal discharge zone (602), and electrodes (604) and (606) as affixed to the reactor by connectors (608) providing electrical connection between the electrodes and the power supply via wires (610). In this configuration, all electrodes of one polarity are introduced from one side of the reactor, and electrodes of the opposite polarity are introduced from the opposite side of the reactor.

FIG. 6(b) is a detail of the electrical connection where the electrode abuts the reactor. Non-conductive material comprising the reactor (620) is seen as in tight contact with the dielectric coating (622) of an electrode (606).

FIG. 6(c) is an electrode (604) or (606) in cross section also showing the dielectric coating (622) and the metal rod core (624). A space between the dielectric and the metal rod accommodates expansion/contraction of the dielectric and metal rod.

FIG. 6(d) is a cross-sectional view of an aggregation of electrodes such as those in 6(c). Positive electrodes (634) are marked "+" and negative electrodes (632) are marked "–". The coronal sheet is depicted as lines between opposite electrodes (636).

FIG. 6(e) shows a section of a reactor (642) with an electrode of a first polarity (644) angled at 90° placed between adjacent walls of the reactor, and parallel thereto is an electrode of opposite polarity ((646).

FIG. 6(f) discloses the dielectric coating (622) and the metal rod core (624) in cross section with the dielectric in generally close position next to the reactor (620), such that gas flow through the system does not substantially flow behind the electrode.

In a specific embodiment the reactor is constructed such that all electrodes of a given polarity are inserted from one side of the reaction chamber and those of the opposite polarity are inserted from the opposite side (FIG. 6(a)). In some instance this entails a first side connection to the reaction chamber being the high voltage connection and the connection, from the opposing side of the reaction chamber being the ground connection.

It is a specific advantage of this invention that high efficiency threshold can be exceeded at less than optimal reactor conditions. Specifically, in a multiple electrode open array configuration, the loss of function of electrodes representing only a minor fraction of the total number of electrodes will not prevent high efficiency performance.

In any dielectric material there exists a critical field strength that represents the point where the dielectric material breaks down and becomes conductive. In a gas, the result of reaching the critical field strength is an electrical discharge. When the field strength being developed drops below the critical value at some point in the gas (i.e., before reaching the other electrode), then the gaseous discharge is a low energy corona and is arc-free. However, if the field strength of the electrical field established throughout the gas between the two electrodes is above the critical field strength value, the electrical discharge is then in the form of an arc.

In some embodiments, the dielectric material is solid dielectric material useful in the subject invention. These non-gaseous dielectric materials display a critical field strength breakdown point significantly greater than that for the gas being treated. As such, the gas becomes conductive well before the non-gaseous (including solid) material.

In the present invention all electrodes are covered with a dielectric material that separates the electrode from the space open to the gas to be treated. The voltage of primary concern in this case is that being applied between the opposing surfaces of the dielectric materials.

Figure 7:
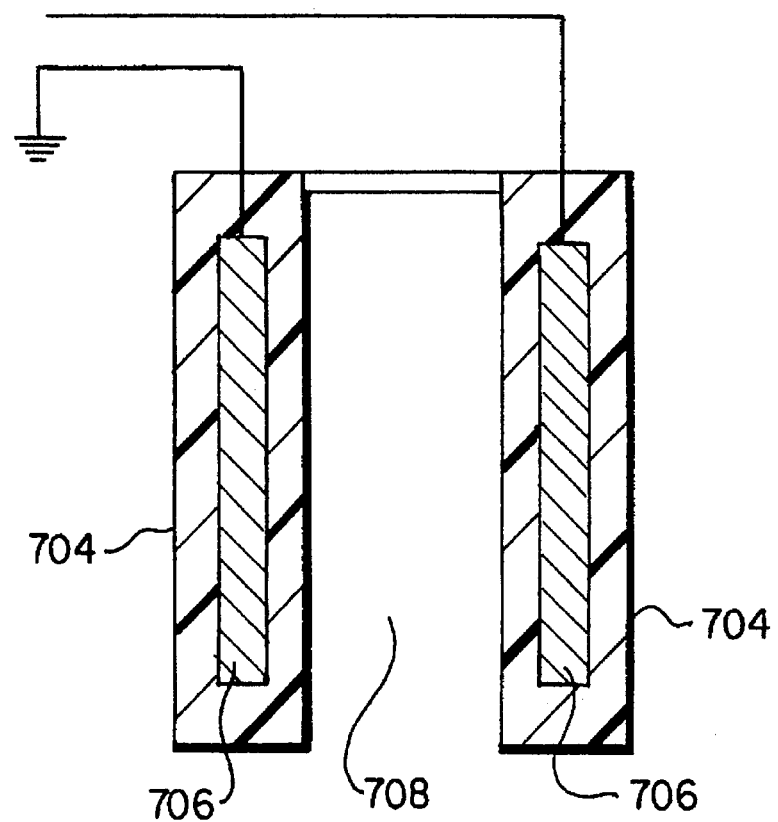
FIG. 7 is a schematic model of an embodiment of the invention.
Figure 7A:
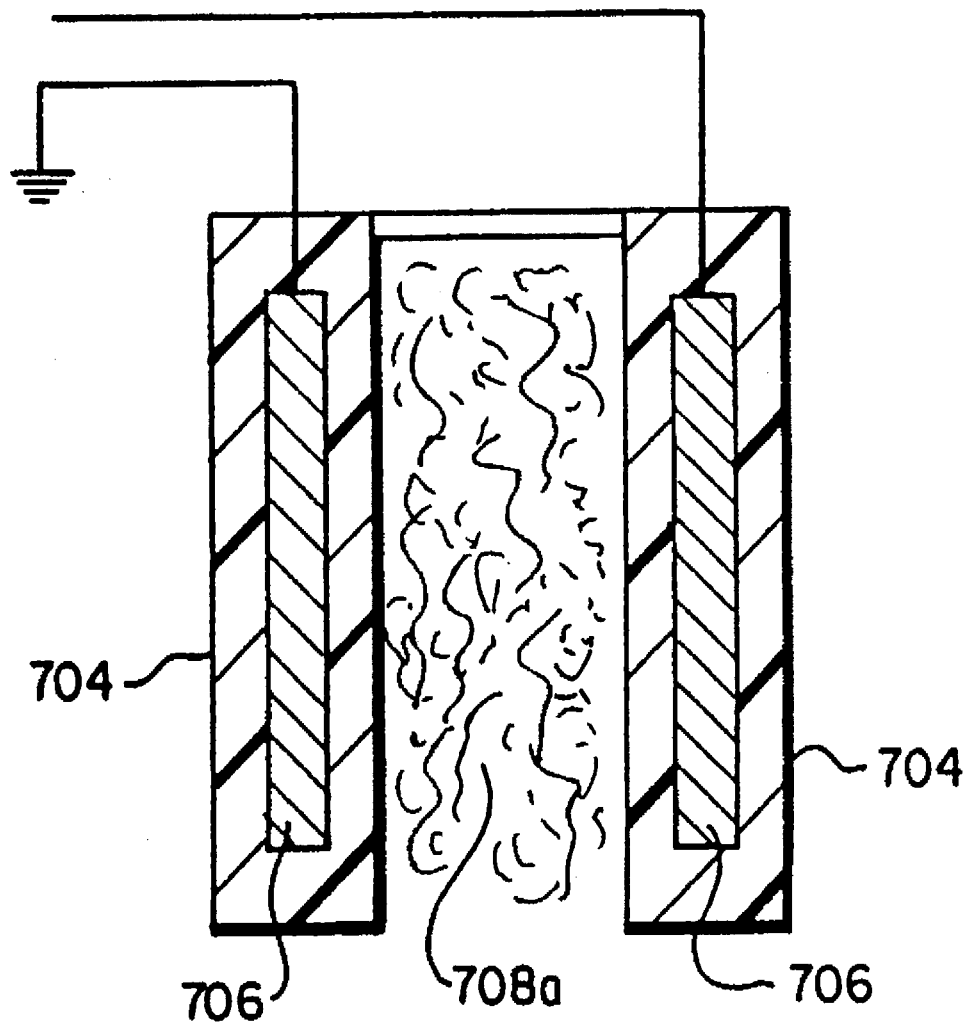
FIG. 7(a) is a coronal discharge zone comprising the high-dielectric coronal catalyst glass wool.

Electrode arrangements are capable of being modeled mathematically to predict the power consumed in the corona discharge, and to characterize various parameters controlling the discharge, so that particular electrode arrangements can be optimized. For example, the electrode arrangement shown in FIG. 7 discloses two electrodes each with a dielectric (704) and a conductive core (706) and an air space between (708). FIG. 7 is modeled as an electrical circuit consisting of two capacitors ($C_1$, $C_2$) and a resistor ($R_1$). The second capacitor $C_2$ and the resistor $R_1$ are in parallel to each other and both are connected in series to the first capacitor $C_1$. The first capacitor $C_1$ is representative of the glass dielectric barriers (704) formed about opposing electrodes (706). The parallel second capacitor $C_2$ and resistor $R_1$ are representative of the gas space (708) disposed between the dielectric barriers and electrodes. FIG. 7(a) repeats FIG. 7, but the coronal discharge zone further comprises the high-dielectric coronal catalyst glass wool (708a).

The above model is based on the assumption that the representative electrical circuit is described in terms of pure capacitive and resistive elements; that the circuit characteristics do not effect the input voltage waveform; that the gas has an infinite resistance prior to the onset of a corona; and that the gas takes on a finite value of resistance after initiating a corona. The model also assumes that an AC high voltage from about 10 to about 35 kV RMS at frequencies ranging from about 60 to about 1000 Hz is applied to the center electrode while the outer electrode is held at ground, and that the AC voltage being applied has a sinusoidal waveform.

For this electrical circuit model the reactance of each circuit element is given by the following relationships:

$$X_{c1} = -\frac{\ln b/a}{2\pi\epsilon_0\omega k_1 l}$$

$$X_{c2} = -\frac{\ln c/b}{2\pi\epsilon_0\omega k_2 l}$$

$$R_3 = \frac{\rho \ln c/b}{2\pi l}$$

where:

a is the radius of the center electrode (where the barriers are of like material, e.g., glass/glass; these formulae, are adjusted where the barriers of unlike materials or of different diameters)), b is the radius for the outer surface of a dielectric barrier, c is the radius for the outer electrode, l is the length of the electrode arrangement or reactor, $X_{c1}$ is the capacitive reactance of the glass barrier, $X_{c2}$ is the capacitive reactance of the gas space, $R_3$ is the resistance of the gas space (Ohms), f is the frequency of the applied voltage (Hz), $k_{1,2}$ are the dielectric constants of the glass barrier and gas space respectively, $\epsilon_0$ is the permissively of free space ($8.854 \times 10^{-12}$ $C^2/N$ $m^2$), $\omega$ is the angular frequency ($2\pi f$ radians/sec.), $\rho$ is the resistivity of the gas (Ohms cm), and $\phi$ is the phase angle (radians).

The current through the circuit is given by the relationship:

$$I = \frac{V}{jX_{c1} + \frac{jX_{c2}R_3}{jX_{c2} + R_3}}$$

where:

$$V = V_{max}\sin(\omega t + \phi)$$

As indicated above before the onset of the corona the resistance of the gas is essentially infinite resulting in a purely reactive circuit with the phase shift ($\phi$) between the voltage and current equal to 90°. The current in the circuit before the onset of the corona is given by the following relationship.

$$I = \frac{2\pi l k_1 k_2 \epsilon_0 \omega V_{max}\sin(\omega t + \pi/2)}{k_2 \ln b/a + k_1 \ln c/b}$$

After the onset of the corona the resistivity of the gas is a function of the difference between the voltage at the outer surface of the glass barrier ($V_2$) and the voltage required for corona initiation ($V_{2,c-o}$). The resistance of the gas, the current through the circuit, and the phase angle are given by the relationships:

$$\rho = \frac{2\pi V_2 \delta c^2}{k^*(V_2 - v_{2,c} - 0)^2 \ln c/b}$$

$$I = \frac{\left(\frac{1}{\epsilon_0 \omega} + k_2^2\rho^2\epsilon_0\omega\right) 2\pi l V_{max}\sin(\omega t + \phi)}{\left[\left(\frac{\rho \ln c/b}{\epsilon_0 \omega}\right)^2 + \left[\frac{\ln b/a}{k_1 \epsilon_0^2 \omega^2} + k_2^2\rho^2\left(\frac{\ln b/a}{k_1} + \frac{\ln c/b}{k_2}\right)\right]^2\right]^{1/2}}$$

$$\phi = \tan^{-1}\left[\frac{\ln b/a}{k_1 \ln c/b}\left(\frac{1}{\epsilon_0\omega\rho} + k_2^2\epsilon_0\omega\rho\right) + k_2\epsilon_0\omega\rho\right]$$

where:

$k^* = 2.2 \times 10^{-12}$ amp-cm/volt$^2$, and $\delta$ = temperature correction factor (530/T+460).

The voltage ($V_{c-o}$) and phase angle ($\omega t_{c-o}$) at which corona initiation takes place are given by the following relationships.

$$V_{c-o} = V_{max}\sin(\omega t_{c-o} + \phi)$$

$$wt_{c-o} = \cos^{-1}\left[-\left(\frac{300}{F}\right)^{.16}\left(\frac{30,000\delta b + 9000\sqrt{\delta b}}{V_{max}}\right)\left(\frac{k_2 \ln b/a}{k_1} + \ln c/b\right)\right] - \frac{\pi}{2}$$

The model is used to provide several parameters involved in the design of the electrode arrangement for a coronal catalytic reactor. In addition to the power consumed, the model predicts maximum voltage gradients between the glass barriers for differing electrode arrangements and for differing conditions. These predicted values are then compared with the maximum allowed gradients before breakdown of the glass or arcing in the gas space occurs.

From the foregoing relationships; it is seen that the power input to the corona and the reactor is primarily a function of the length of the electrode assembly of a reactor, the applied voltage and the frequency of the applied voltage. By increasing the frequency of the voltage applied, a greater power can be inputted to a reactor for a given applied voltage and reactor geometry. The spacing of the inner and outer electrodes also effects the voltage at which corona initiation takes place (e.g., decrease the spacing decreases the voltage). FIG. 4 presents the power consumed and the voltage gradients in the glass dielectric barrier and the gas space for varying voltages and frequencies applied to one reactor electrode configuration operating at 220° F., for a reactor of tubular configuration having a center electrode of 0.2 cm diameter covered by a dielectric barrier being 0.3 cm in diameter and the outer electrode 1.43 cm in diameter, with a length of 122 cm and a Kd (dielectric constant) of 4.

a comparison of the predicted and experimental voltage and currents for two different coronal catalytic reactor configurations is shown in FIGS. 2 and 3. The figures show good agreement between the calculated and experimentally measured values of current with the largest deviations due to the difference between sinusoidal voltage used in the model and the actual voltage applied to the reactor. FIGS. 2 and 3 also provides a plot of the predicted versus measured power for several reactor operating conditions.

Figure 6:
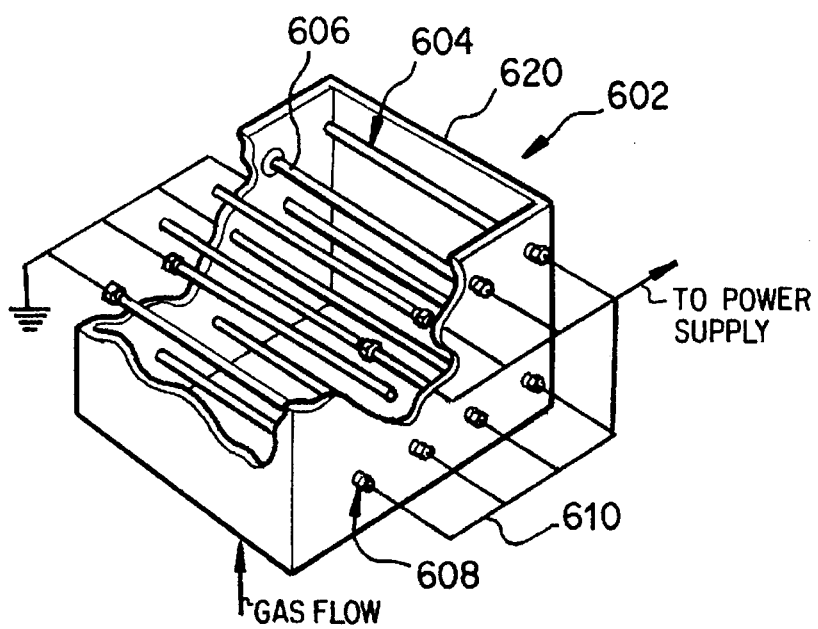
FIG. 6(a) discloses multiple spaced substantially parallel interdigitating substantially linear high-dielectric coated electrodes.
FIGS. 6(b), (c) and (d) disclose details of a particular embodiment of electrode presentation.
FIG. 6(c) is a cross section of electrode and FIG. 6(d) is a representation of a sheet corona disposed between electrodes.
FIG. 6(e) is a detail of a "bent" electrode pair in parallel orientation.
FIG. 6(f) depicts an electrode disposed against the reactor wall so no gas can go "behind" it.
Figure 6:
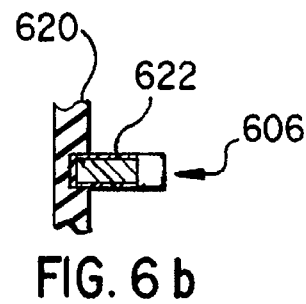
Figure 6:
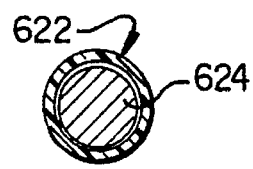
Figure 6:
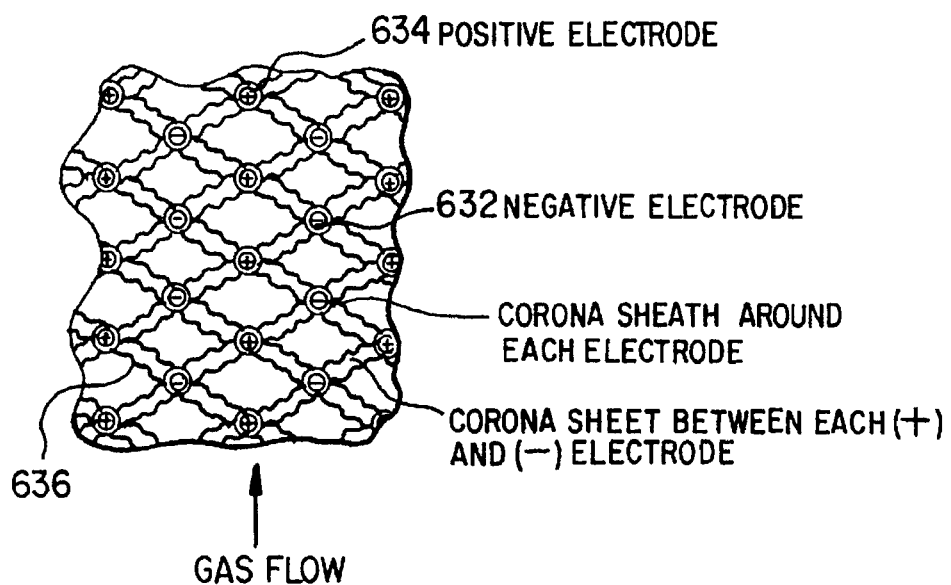
Figure 6:
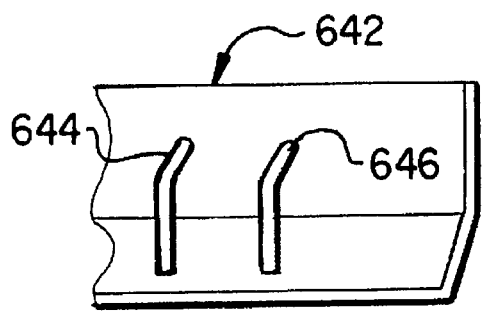
Figure 6:
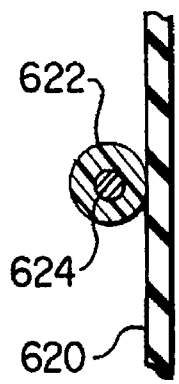

In this way, the model is used to determine if, under normal operating conditions, the voltage being applied to a given electrode arrangement will cause the dielectric barrier to breakdown electrically and/or establish an electrical field throughout the gas space above the critical field strength so that arcing occurs. It should be recognized that the system is recoverable from transient gas space conditions where the gas space becomes conductive momentarily and an arc occurs. The gas space can become momentarily conductive if, for example, a large burst of water vapor or a large effluent particulate (e.g., ash or a cinder) is in the gas stream passing between the electrodes. In such a case, the system reestablishes the corona after arcing and the process continues. With solid electrodes, arcing could break a friable glass tube type dielectric. It is understood that high dielectric material in other "reformable" forms such as a contained fluidized bed powder or particulate canavoid arc caused fracture. In a multiple electrode array within a reaction chamber, a few individual electrode failures, if individually fused, would not substantially compromise total system performance, as such array exposes gas to corona with such high efficiency, as shown in FIG. 6.

K. "Zone" as used in relation to a "supra-arc voltage arc-free zone" shall mean that cross sectional area of the gas space where the voltage being applied across the electrodes is sufficient to establish an electrical field having a field strength above the critical field strength value, but not so high as to establish a condition conducive to sustained arcing between the electrodes. Clearly, depending on the varying make up of flue gas, infrequent or intermittent arcing is a possibility that does not exclude a zone or area from the "arc-free" designation. Reference should be made to FIGS. 3(a), (b) and the discussion thereto for further details regarding supra-arc voltage arc-free zones.

L. "Critical field strength" shall mean that voltage at which the barrier material (a high dielectric) under the influence of the voltage breaks down and becomes electrically conductive.

M. "Short rise time" refers to a wave form rise time to peak voltage of less than about 100 nanoseconds, and particularly in the range of about 0.1 to about 100 nanoseconds, and particular about 1 to about 50 nanoseconds.

N. "High Dielectric" refers to a dielectric constant approximately of glass—about 4—or about 100 or beyond (i.e., $TiO_2$).

O. "Environment effective" shall mean DRE of total VOC/CVOC/HVOC by at least about 25% to 30% (i.e., volume %). In particular applications, such reductions shall be, variously, at least 40%, 50%, 60%, 70% 80%, 90%, and, preferably, by about 98% and more preferably about 99.4%.

P. "Hypercritical presentation" to a VOC bearing gas stream shall mean establishing an electrical field which generates electrons with energies of at least about 1 eV. In particular embodiments at least about 2 eV, at least about 2.3 eV, at least about 5 eV, or at least about 6.5 eV is employed. In particular embodiments parameters augmenting the efficiency of hypercritical presentation include:

1. Operation from about 40° F. to about 400° F. Greater temperatures are possible but not required.
2. Water vapor present in the reaction area up to about the dew point concentration.
3. Oxygen up to about 21%.
4. Voltage from about 4000 to about 60,000 volts. In particular it is observed that rate of change in voltage going from about zero to a level up to maximum augments efficiency. In various applications known wave forms such as sine, square, triangle and pulse as well as others are useful.
5. Frequency of from about 50 Hz to about 60,000 Hz.

In particular embodiments, gas is recycled through the apparatus to permit further reaction.

Hypercritical reaction conditions are easily determined empirically. If VOC is not being effectively removed, removal is increased by increasing voltage, increasing power, increasing residence time, modulating temperature, increasing the frequency of the applied voltage, modulating $O_2$ content, modulating CO content, or modulating $H_2O$ content. Hypercritical presentation also recognizes that there is a threshold voltage below which no substantial VOC reduction will occur. Upon reaching the threshold voltage some variability in reduction is observed during an equilibration or ignition phase of the reduction reaction.

In particular embodiments, modulation of rise time to a short rise time will augment hypercritical presentation.

"% VOC Conversion" shall mean:

$$\% CONV_{VOC} = \left[ \frac{(VOC_{into} - VOV_{i,out})}{VOC_{into}} \right] 100$$

"% VOC Reduction" [also, destruction] shall mean:

$$\% RED_{VOC} = \left[ \frac{(VOC_{into} - VOC_{out})}{VOC_{into}} \right] 100$$

where:

$VOC_{into}$ is the VOC concentration of the gas stream entering into a coronal catalytic reactor, $VOC_{i,out}$ is the VOC concentration of a particular species, "species I," in the gas stream exiting from the coronal catalytic reactor (For example, xylene can be converted, but such conversion can also include, in part, benzene), $VOC_{out}$ is the concentration of VOC in the gas stream exiting from the coronal catalytic reactor (Thus, if an organic compound is totally reduced to, for example, CO, $CO_2$, $H_2O$, and HCl, the $VOC_{out}$ is zero.

Percentages are necessarily w/w, because the moles of material will vary depending on the conversion or reduction products produced, while mass is conserved.

Without being bound by any particular theory, it is believed that the coronal-catalytic reduction phenomenon is based on the energy input of corona catalyzed reactions. a corona is an energetic electric field in which there is a cool discharge promoting the free flow of electrons through the inter-electrode spaces. It is important to distinguish the cool discharge herein employed from a hot discharge. a cool discharge is distinguished in that (1) only the electrons gain appreciable energy through the system and therefor increased temperature, leaving the bulk of material flowing through the system largely substantially unheated and thus exiting at the approximate entry temperature, and (2) it is generally an evenly distributed discharge over the entire reactor volume, whereas a hot discharge is typically a local point to point arc engaging very little volume.

In order to design, to a given scale, a coronal catalytic reactor of the present invention, it is useful to understand the reaction kinetics and the model rate of conversion. From collision theory, the reactor rate is expressed as:

$$R = Q Z_{AB}$$

where q is the fraction of effective collisions and $Z_{AB}$ is the collision number, the number of collisions per unit time. In the present case, the collision number is the number of collisions of organic moieties with electrons. The value is determined from the cross-section for collision, the relative speed of the two species and the concentration of the each species. This is expressed as:

$$Z_{AB} = S V N_A N_B$$

where S is the reactor cross section, V is the relative speed, $N_A$ is the concentration of the species a and $N_B$ is the concentration of the species B. Assuming that the VOC molecule is relatively stationary in the oscillating electric field, then V is simply the electron speed, c.

The reaction cross section is a function of velocity, and is expressed as:

$$S = S(c) = \beta c^n$$

Taking species a to be an organic moiety and species B to be the electrons, $Z_{AB}$ is expressed as:

$$Z_{AB} = Z N_B$$

where Z is the collision frequency, that is expressed as:

$$Z = S(c) c N_A$$

The speed of the electron is expressed as:

$$c = \left( \frac{4 \lambda^2 a^2}{h} \right)^{0.25}$$

where, $\lambda$ is the mean free path, a is the electron acceleration and h is the mass ratio of the electron to the organic moiety or molecule.

The acceleration of the electron is expressed as:

$$a = \frac{q_e E_0}{m}$$

where $q_e$ is the electron charge, $E_o$ is the field strength and m is the electron mass. The field strength is a function of the applied voltage, the reactor geometry and the dielectric constant of the materials within the applied voltage field.

The concentration of electrons is found from the current, geometry and electron speed. For a tubular coronal catalytic reactor, the electron concentration is expressed as:

$$i = \frac{I \ln(r_a / r_b)}{2 \pi (r_a - r_b) L q_e c A_0}$$

where, I is the current, $r_{a,b,c}$ are system radii, L is the reactor length, and A is Avogadro's number. Substituting and simplifying, the rate is expressed as:

$$R = \frac{d(NO)}{dt} = q' c^n [NO] i$$

where q' is a composite constant. The conversion is then given by:

$$X = 1 - e^{-q' c^n i t_u}$$

The only unknowns being q' and n, where n is the functionality of reactor cross section. X is also referred to as DRE, destruction and removal efficiency (as a sum of both that removed and that destroyed in percentage).

Figure 8:
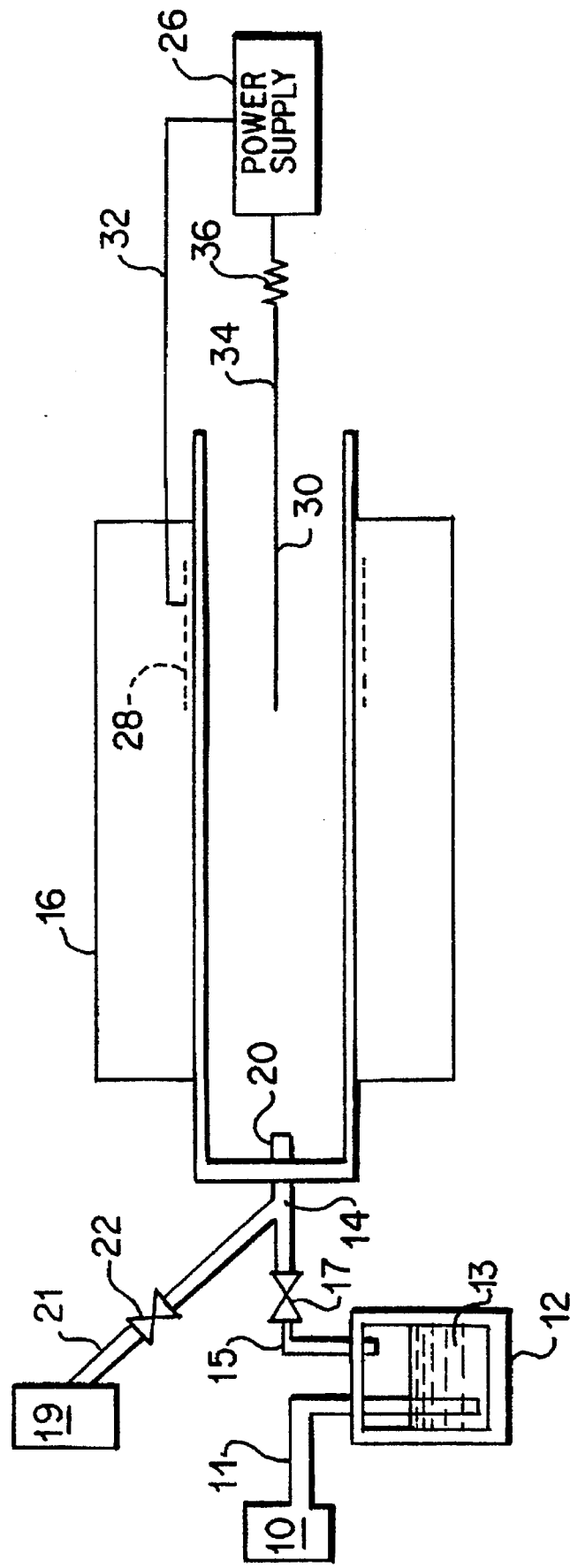
FIG. 8 is a schematic diagram of a test apparatus.

A test apparatus for determining VOC removal is schematically represented in FIG. 8. Tests included VOCs benzene and TCE. These were put into gas (air) by bubbling at a fixed flow rate of air through a known volume of VOC to saturate the bubbled air. The concentrated VOC bearing gas stream was then mixed with total reactor flow to adjust the concentration and fed to the reactor. The reactor was powered and the DRE measured after exposure to the powered area.

A first air supply (10) flowing through line 11 bubbles air through the liquid VOCs (13) in vessel (12). The saturated outflow of air flows through line (15) into the reactor. The saturated flow rate is adjustable by valve (17) The VOC bearing gaseous mixture was passed through a mixing section (14) prior to entering the reactor (16). The gaseous mixture is introduced into the furnace through a 1 inch diameter tube (20), in this apparatus the tube is fashioned from a glass, high silicone glass or ceramic insulator (e.g., Vycor™, Corning Glass Works, Troy N.Y.). A second air source (19) provides air to admix with the VOC containing air. Air from (19) flows down line (21) and is controllable by valve (22).

The reactor is 48" in length. The coronal discharge area was packing free. This packing free area is energized by a power supply 26 connected to the outer high dielectric coated electrode 28 through line 32 and connected to the inner high dielectric coated electrode 30 through line 34 that is equipped with a resistor 36.

Figure 9:
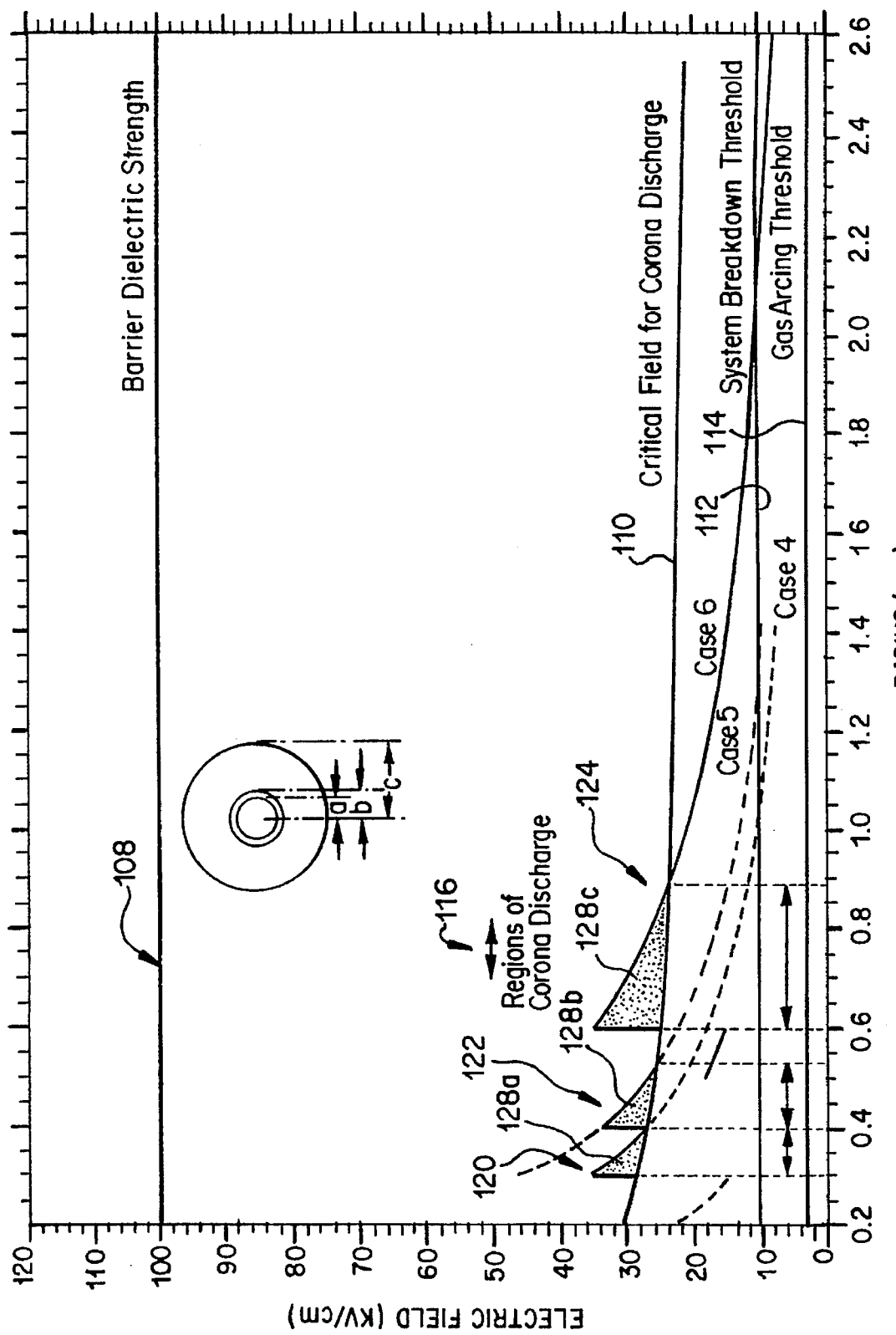
FIG. 9 are graphs of field distribution as a function of radius for various voltages.

FIG. 9 graphically presents the electrical field distribution of a tubular coronal catalytic reactor as a function of radius for three different reactor geometries when the voltage being applied has a frequency of 1000 Hz. FIG. 9 also includes a pictorial representation of the tubular reactor. a unique electrical field distribution, curves 120, 122, 124 provides the results of different geometries. The following are the applicable parameters for each of these cases [refer to tubular reactor pictorial of FIG. 9 for description of a,b,c].

| Parameter | Case 1 | Case 2 | Case 3 |
| --- | --- | --- | --- |
| a (cm) | 0.2 | 0.3 | 0.5 |
| b (cm) | 0.3 | 0.4 | 0.6 |
| c (cm) | 1.43 | 1.43 | 2.54 |
| $V_{max}$ (kV) | 18 | 18 | 31 RMS |
| $T_{op}$ (°F.) | 220 | 220 | 220 |

FIG. 9 includes a curve representative of the glass barrier dielectric strength-curve 108, a curve representative of the critical field strength needed to initiate a corona discharge in a gas-curve 110, a curve representative of the reactor's, as a system, breakdown threshold-curve 112, and a curve representative of the gas arcing threshold-curve 114.

The electric field distributions for all three cases, curves 120, 122, 124, based on the foregoing, indicate that the associated reactors are acceptable design configurations because the electric field distribution curve for all three cases falls below the system breakdown threshold curve 112 in the gas space (i.e., before reaching the outer electrode). As such the regions 128a–c of the three electrical distribution curves 120, 122, 124 that lie above the critical field strength curve 112 are considered to be supra-arc voltage arc-free zones.

For a given reactor, the volume or cross sectional area of the corona must be at its maximum without producing arcing to make most efficient use of power. Also the power distribution in the corona should be as even as possible to prevent unwanted side reactions.

Figure 10:
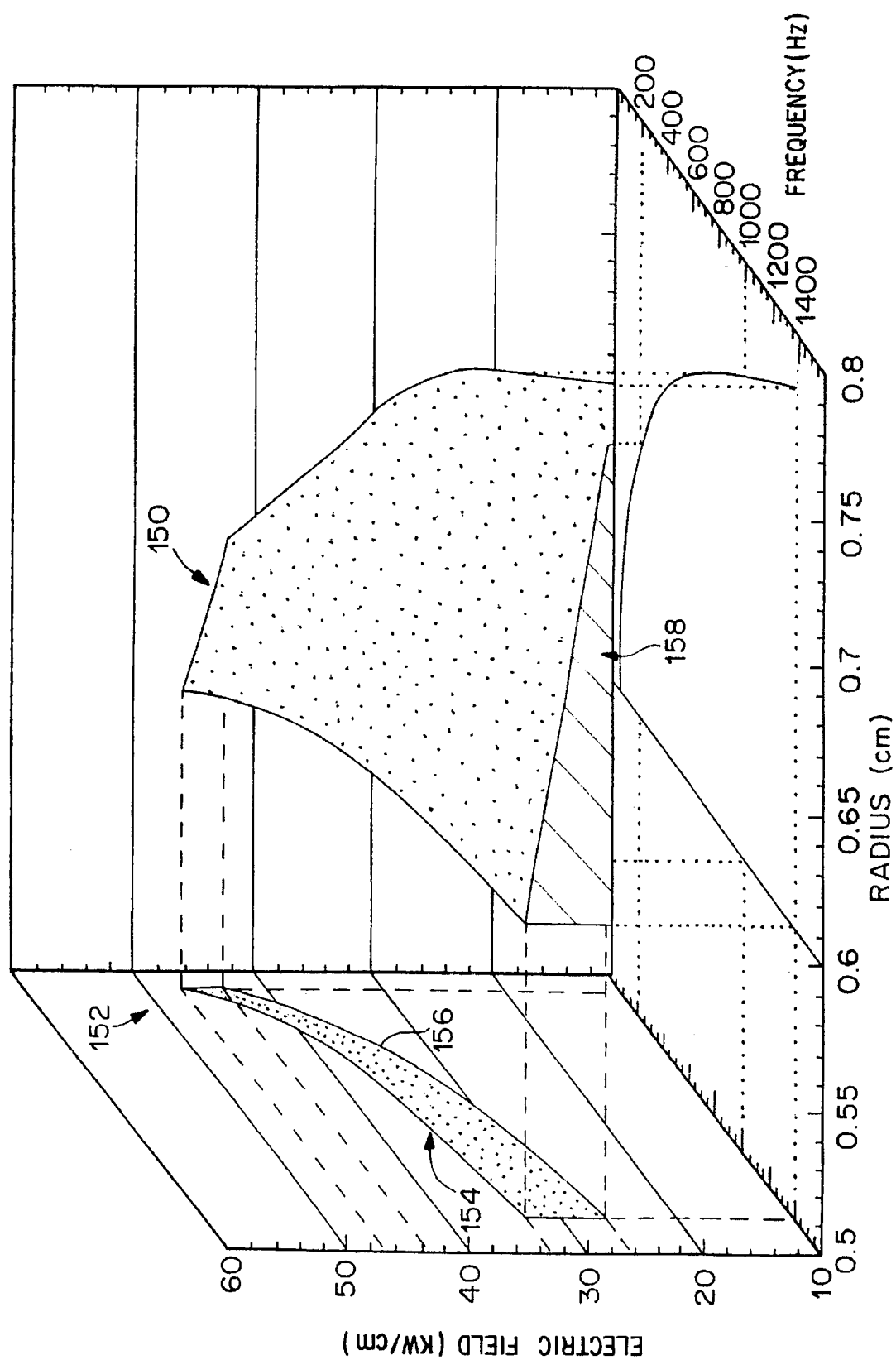
FIG. 10 is a 3 D plot of electrical field distribution in a tubular apparatus.

FIG. 10 is a three dimensional (3D) plot of the electrical field distribution in part of the gas space for a tubular coronal catalytic reactor as a function of both reactor radius and frequency of the applied voltage. (While the present invention entails configurations other than tubular, the mathematical representations are far simpler based on a tubular model.) The plot generally covers that part of the gas space in which a corona would be established by a reactor of the present invention. For this reactor, the maximum voltage; being applied across the electrodes ($V_{max}$) was adjusted to maintain a constant power input to the reactor. From this plot one can also readily see the how the extent of coverage and the power input to a supra-arc voltage arc-free zone increases as the frequency for the applied voltage increases.

The corona established in the arc-free corona area 150 for this reactor geometry is supra-arc voltage arc-free because the electrical field distribution for all the identified frequencies of the applied voltage exceeds the critical field strength value in the arc-free corona area 150 but the distribution falls below the system breakdown threshold well before the edge of the gas space (not shown) is reached. It should be recognized that a slice 158 through the arc-free corona area 150 at a fixed frequency would yield a field distribution curve like that shown in FIG. 9 for the region 116 of corona discharge. For example, a slice through the arc-free corona area 150 at 1000 Hz would correspond to the supra-arc voltage arc-free zone 128c of FIG. 9. The projection 152 of the variation in the electrical field distribution as a function of frequency also illustrates pictorially how much the electric field distribution at the wall of the dielectric, curve 154 exceeds the critical field strength value, curve 156.

The ratio of corona volume to total power is the parameter used to determine the effectiveness of various reactor geometries is a plot of the ratio of corona volume to power versus voltage for reactors having the physical geometry like that of FIG. 9 operating at a temperature of 220° F. for different applied voltages having a frequency of 60, 200, 400 and 1000 Hz respectively.

The above discussions regarding the electrical modeling of different tubular reactor design configurations indicates that increasing the frequency of the applied voltage reduces power consumption, a concern of large scale systems. However, in small scale systems, such as a residential burner or furnace, it is advantageous to reduce the applied voltage frequency to 60 Hz so a frequency converter is not required thereby simplifying the design while still optimizing VOC removal. In such case higher power input to the reactor is achieved without causing arcing in the gas space by using high dielectric materials, such as glass.

In the practice of this invention all electrodes have a high dielectric barrier between electrode and gas being treated for compound removal. This high dielectric barrier is conveniently in the form of as sheath or coating of the electrode.

It is within the ambit of the present invention for the reduction apparatus to have multiple reactor sections or stages. In addition to generally providing higher overall system conversion, a multi-stage reduction apparatus with high conversion level stages reduces the power required to achieve reduction of a given polutant on compared to a single stage apparatus. For example, a four stage apparatus having stages with a 90% conversion level, requires ½ the power of that needed for a single stage apparatus to achieve the same overall level of reduction.

BENCH TOP TESTS

A series of bench top tests were performed using different concentrations of VOCs (benzene and TCE) to identify variables of interest and to explore reactor performance. The main parameters investigated during the bench top testing and the range explored are provided in the following tabulation.

| BENCH TOP TESTING VARIABLES | |
|---|---|
| REACTOR CONFIGURATION | |
| Length | 48" |
| Outer Electrode | tube |
| Outer Tube Diameter | 1.25" |
| Inner Electrode | rod |
| Inner Electrode Diameter | 0.25" |
| Dielectric Barrier Material | quartz |
| Dielectric Barrier Placement | surrounding electrodes |
| Reactor Packing | none |
| REACTOR ELECTRICAL CONFIGURATION | |
| Waveform | AC |
| Waveform Shape | sine |
| Frequency | DC to 1000 Hz |
| Voltage | 0 to 115,000 Volts (peak) |
| GAS FLOW CONDITIONS | |
| Temperature | 70° F. |
| Velocity | 0.11 to 14.11 ft/sec. |
| Residence Time | 0.2 to 5 seconds |
| GAS COMPOSITION | |
| VOC Content | 260 to 1400 ppm |
| O$_2$ Content | 21% |

The coronal catalytic reactor geometry and materials of construction are important with respect to the generation and effective use of corona discharges for the removal of VOC from gas streams. A schematic of a bench top reactor is shown in FIG. 9. As indicated therein, the bench top reactors are provided with observation ports to enable visual observation of the coronal discharge during operation.

High voltages of various waveforms, voltages and frequencies were used to create a corona discharge in the bench top reactors. The results of testing were as follows:

| | VOC (gas) | | | |
|---|---|---|---|---|
| TIME | (in) benzene | (out) | (in) TCE | (out) |
| 0.2 sec | 1400 ppm | 14 ppm | 260 ppm | 160 ppm |
| 0.45 | | | 450 | 346 |
| 0.47 | | | 450 | 360 |
| 1.0 | | | 450 | 266 |
| 2.0 | | | 380 | 10 |

The principal findings of the bench top testing are as follows.

Power input to the reactor is primarily a function of the reactor length, applied voltage and frequency.

Effect of increasing frequency is to allow greater power input to the reactor for a given applied voltage and geometry.

Decreasing spacing between the inner and outer electrodes reduces the voltage at which corona initiation takes place.

Increasing $O_2$ content increase VOC/CVOC conversion.

Addition of reducing gases to inlet stream does not significantly effect VOC/CVOC conversion.

Increasing residence time increases VOC/CVOC conversion.

Increasing velocity for a given residence time increases reactor performance (i.e. VOC/CVOC conversion), but this is primarily be reason of increased mixing of gas so that coronal exposure is more certain.

What is claimed is:

1. A volatile organic compound environment effective reduction apparatus comprising a reactor-efficient coronal discharge zone, and at least two substantially parallel dielectric coated electrodes of opposing polarity wherein said dielectric is of a reactance of from about 5,000,000 ohms or more at 60 Hz to about 200,000 ohms or more at 1400 Hz, and wherein said coronal discharge zone is in connection with a means for flowing a volatile organic compound bearing gas stream substantially perpendicular to said electrodes.

2. The apparatus of claim 1 wherein said reactor-efficient coronal discharge zone further comprises a cylindrical discharge zone, and centrally located in said cylindrical discharge zone is at least one electrode of said opposing electrodes wherein said central electrode is substantially linear and substantially of round cross sectional area.

3. The apparatus of claim 1 wherein the coronal discharge zone comprises a dielectric coronal-catalyst.

4. The apparatus of claim 3 wherein said dielectric coronal-catalyst comprises glass wool.

5. The apparatus of claim 3 wherein the dielectric coronal-catalyst is in filamentous form.

6. The apparatus of claim 5 wherein the filamentous catalyst comprises alumina, zirconia, magnesia or a titanate.

7. The apparatus of claim 6 wherein the titanate is comprised of calcium, zinc or barium.

8. The apparatus of claim 6 wherein the titanate comprises $TiO_2$.

9. The apparatus of claim 1, further comprising means for exposing the volatile organic compound bearing gas stream to a coronal-catalyst charged at from at least about 1 eV.

10. The apparatus of claim 9 wherein said means is from at least about 2.3 eV.

11. The apparatus of claim 1 wherein said coronal discharge zone is chlorine-resistant.

12. The apparatus of claim 11 wherein said chlorine-resistant coronal discharge zone is glass lined.

13. The apparatus of claim 1 wherein said coronal discharge zone is fluorine-resistant.

14. The apparatus of claim 13 wherein said fluorine resistant coronal discharge zone is polytetrafluoroethylene lined.

15. A chlorine insensitive reactor efficient coronal discharge volatile organic compound reduction apparatus comprising a substantially chlorine resistant interior reaction chamber having a gas inlet and gas outlet;

disposed within said reaction chamber at least two spaced substantially parallel interdigitating substantially linear dielectric coated electrodes; and, means for flowing a volatile organic compound bearing gas stream substantially perpendicular to said electrodes, wherein said electrodes are of opposite polarity, and opposition-maximized and wherein said dielectric is of a reactance of from about 5,000,000 ohms or more at 60 Hz to about 2000,000 ohms or more at 1400 Hz.

16. The apparatus of claim 15 wherein the chlorine resistant reaction interior chamber is non-metal lined.

17. The apparatus of claim 16 wherein further disposed within said reaction chamber is a filamentous coronal-catalyst of glass wool or ceramic-glass wool.

18. The apparatus of claim 16 wherein said non-metal interior reaction chamber is a fluorine resistant non-metal.

19. The apparatus of claim 18 wherein said substantially fluorine resistant non-metal is polytetrafluoroethylene.

20. A reactor-efficient coronal discharge chamber comprising a non-metal reaction chamber having a gas inlet and gas outlet;

disposed within said reaction chamber at least two spaced substantially parallel interdigitating substantially linear dielectric coated electrodes: and, means for flowing a volatile organic bearing gas stream substantially perpendicular to said electrodes, wherein said electrodes are of opposite polarity and opposition-maximized and wherein said dielectric is of a reactance of from about 5,000,000 ohms or more at 60 Hz to about 200,00 ohms or more at 1400 Hz.

21. The apparatus of claim 20 where, in further disposed within said reaction chamber is a filamentous coronal-catalyst of glass wool or ceramic-glass wool.

22. The apparatus of claim 20 wherein said non-metal interior is a fluorine resistant non-metal.

23. The apparatus of claim 22 wherein said substantially fluorine insensitive non-metal is polytetrafluoroethylene.

24. A method of volatile organic compound environment effective reduction comprising providing an apparatus comprising a reactor-efficient coronal discharge zone, and at least two substantially parallel dielectric coated electrodes of opposing polarity wherein said dielectric is of a reactance of from about 5,000,000 ohms or more at 60 Hz to about 200,000 ohms or more at 1400 Hz, and wherein said coronal discharge zone is in connection with a means for flowing a volatile organic compound bearing gas stream substantially perpendicular to said electrodes and subjecting the volatile organic compound nearing gas stream to a reactor-efficient coronal discharge zone of said apparatus, wherein said coronal discharge zone exposes said gas to a coronal-catalyst charged at from at least about 1 eV.

25. The method of claim 24 wherein said reactor-efficient coronal discharge zone further comprises a cylindrical discharge zone, and centrally located in said cylindrical discharge zone is at least one electrode of said opposing electrodes wherein said central electrode is substantially linear and substantially of round cross sectional area.

26. The method of claim 24 wherein the coronal discharge zone comprises a dielectric coronal-catalyst.

27. The method of claim 26 wherein the dielectric coronal-catalyst is in filamentous form.

28. The method of claim 27 wherein the filamentous catalyst comprises alumina, zirconia, magnesia or a titanate.

29. The method of claim 28 wherein the titanate comprises $TiO_2$.

30. The method of claim 27 wherein the titanate is comprised of calcium, zinc or barium.

31. The method of claim 24 wherein said dielectric coronal-catalyst comprises glass wool.

32. The method of claim 24 wherein said gas is exposed to coronal-catalyst charged at from at least about 2.3 eV.

33. A method of decomposing halogenated volatile organic compounds carried in a gas stream flowing in chlorine insensitive coronal discharge volatile organic compound reduction apparatus comprising flowing said gas stream in a substantially chlorine resistant interior reaction chamber having a gas inlet and gas outlet; and, disposed within said reaction chamber and substantially perpendicular to said gas stream at least two spaced substantially parallel interdigitating substantially linear dielectric coated electrodes of a reactance of about 5,000,000 ohms or more at 60 Hz to about 200,000 ohms or more at 1400 Hz, wherein said electrodes are of opposite polarity, and opposition-maximized by the step of exposing said stream to a coronal-catalyst charged at from at least about 1 eV.

34. The method of claim 33 wherein said gas is exposed to coronal-catalyst charged at from at least about 2.3 eV.

35. The method of claim 34 wherein said gas is exposed to coronal-catalyst charged at from at least about 6.5 eV.

* * * * *